(12) United States Patent
Chen et al.

(10) Patent No.: US 7,525,271 B2
(45) Date of Patent: Apr. 28, 2009

(54) MOTOR DRIVING CIRCUIT HAVING LOW CURRENT CONSUMPTION UNDER A STANDBY MODE

(75) Inventors: Kun-Min Chen, Changhua County (TW); Ching-Sheng Li, Hsinchu County (TW); Shiue-Shr Jiang, Changhua County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 209 days.

(21) Appl. No.: 11/763,450

(22) Filed: Jun. 15, 2007

(65) Prior Publication Data

US 2008/0252245 A1 Oct. 16, 2008

(30) Foreign Application Priority Data

Apr. 10, 2007 (TW) .............................. 96112470 A

(51) Int. Cl.
*H02P 7/00* (2006.01)

(52) U.S. Cl. .................. 318/434; 318/293; 318/432; 318/599

(58) Field of Classification Search .................. 318/432, 318/434, 290, 293, 294, 599, 811
See application file for complete search history.

(56) References Cited

U.S. PATENT DOCUMENTS

| 5,061,885 | A | * | 10/1991 | Fukuhara | 318/434 |
| 5,912,539 | A | * | 6/1999 | Sugitani et al. | 318/434 |
| 6,384,556 | B1 | * | 5/2002 | Mizumoto et al. | 318/293 |
| 6,806,669 | B2 | * | 10/2004 | Griesemer et al. | 318/434 |
| 6,940,241 | B2 | * | 9/2005 | Lange et al. | 318/434 |
| 7,411,367 | B2 | * | 8/2008 | Tsai et al. | 318/434 |
| 7,432,678 | B2 | * | 10/2008 | Yokouchi et al. | 318/434 |

* cited by examiner

*Primary Examiner*—Bentsu Ro
*Assistant Examiner*—Thai Dinh
(74) *Attorney, Agent, or Firm*—Winston Hsu

(57) ABSTRACT

A power cutter, an oscillator, a counter, a S-R latch, and a Hall bias are further disposed inside a DC motor driving circuit so that current consumption of the DC motor driving circuit is reduced significantly under a standby mode. When the counter detects that a received pulse width modulation signal stays at a low electrical level over a predetermined time, the counter triggers the S-R latch so as to activate a disabling signal of the power cutter for shutting down most elements until the pulse width modulation signal returns to a high electrical level. With the aid of the built-in Hall bias, space for externally coupling the Hall bias is saved, and moreover, a Hall sensor retrieves a dynamically-adjusted power and currents so that remarkable current consumption is saved under a standby mode.

5 Claims, 5 Drawing Sheets

007525271B2

MOTOR DRIVING CIRCUIT HAVING LOW CURRENT CONSUMPTION UNDER A STANDBY MODE

BACKGROUND OF THE INVENTION

1. Field of the Invention

The present invention relates to a motor driving circuit, and more particularly, to a motor driving circuit having low current consumption under a standby mode.

2. Description of the Prior Art

A conventional DC motor is equipped with a specific driving circuit, for manipulating a driving voltage of the DC motor or occasions for operating the DC motor. The conventional DC motor is primarily operated by magnetic forces, which are generated from repeated variation of electromagnetic forces generated by two torques, where both the torques are inverse in orientations and are generated by magnetic fields, which are generated by repeatedly changed orientations of currents, in the DC motor. However, under certain circumstances, the conventional DC motor is not required to operate, and therefore, power of the DC motor has to be reduced at this time for avoiding unnecessary power consumption.

FIG. 1 is a diagram of a conventional DC motor driving circuit 100. As shown in FIG. 1, the DC motor driving circuit 100 includes a driving module 101. The driving module 101 includes a control module 102, an H-shaped full-bridge circuit 104, an operational amplifier 106, a comparator 108, a transistor 110, a lock/restart module 112, and a thermal shutdown module 114. The DC motor driving circuit 100 further comprises a motor 116, a frequency generating resistor 118, a motor driving voltage source 120, a first diode 122, a capacitor 124, a Hall sensor 126, and a conventional resistor 128. The H-shaped full-bridge circuit 104 has a first input terminal coupled to a first output terminal of the control module 102, a second input terminal coupled to a second output terminal of the control module 102, a third input terminal coupled to a third output terminal of the control module 102, and a fourth input terminal coupled to a fourth output terminal of the control module 102. The H-shaped full-bridge circuit 104 has a first output terminal coupled to a pin OUT1 of the driving module 101, and a second output terminal coupled to a pin OUT2 of the driving module 101. The operational amplifier 106 has a first output terminal coupled to a first input terminal of the control module 102, a second output terminal coupled to a second input terminal of the control module 102, a first input terminal coupled to a pin H+ of the driving module 101, and a second input terminal coupled to the pin H− of the driving module 101. The comparator 108 has a first input terminal coupled to the first input terminal of the control module 102, and a second input terminal coupled to the second input terminal of the control module 102. The transistor 110 has a gate coupled to a first output terminal of the comparator 108, a source coupled to ground, and a drain coupled to a pin FG of the driving module 101. The lock/restart module 112 has an input terminal coupled to the second output terminal of the comparator 108, and an output terminal coupled to a third input terminal of the control module 102. The thermal shutdown module 114 has an output terminal coupled to a fourth input terminal of the control module 102. The motor 116 has a first terminal coupled to the pin OUT1 of the driving module 101, and a second terminal coupled to the pin OUT2 of the driving module 101. The frequency generating resistor 118 has a first terminal coupled to the pin FG of the driving module 101. The motor driving voltage source 120 has a positive terminal coupled to a second terminal of the frequency generating resistor 118, and a negative terminal coupled to ground. The first diode 122 has a positive bias terminal coupled to the positive terminal of the motor driving voltage source 120. The capacitor 124 has a first terminal coupled to both the negative terminal of the motor driving voltage source 120 and a pin VDD of the driving module 101, and a second terminal coupled to ground. The Hall sensor 126 has a first output terminal coupled to the pin H+ of the driving module 101, a second output terminal coupled to the pin H− of the driving module 101, and a negative bias terminal coupled to ground. The resistor 128 has a first terminal coupled to a positive bias terminal of the Hall sensor 126, and a second terminal coupled to the pin VDD.

The H-shaped full-bridge circuit 104 includes four transistors as shown in FIG. 1, where the four transistors include a first P-type MOSFET 130, a second P-type MOSFET 134, a first N-type MOSFET 138, and a second N-type MOSFET 142. The H-shaped full-bridge circuit 104 further includes four diodes as shown in FIG. 1, where the four diodes include a second diode 132, a third diode 134, a fourth diode 140, and a fifth diode 144. The first P-type MOSFET 130 has a gate coupled to the first input terminal of the H-shaped full-bridge circuit 104. The second diode 132 has a first terminal coupled to a drain of the first P-type MOSFET 130, and a second terminal coupled to a source of the first P-type MOSFET 130. The second P-type MOSFET 134 has a gate coupled to the third input terminal of the H-shaped full-bridge circuit 104. The third diode 136 has a first terminal coupled to a drain of the second P-type MOSFET 134, and a second terminal coupled to a source of the second P-type MOSFET 134. The first N-type MOSFET 138 has a gate coupled to the second input terminal of the H-shaped full-bridge circuit 104, and a drain coupled to the drain of the first P-type MOSFET 130. The fourth diode 140 has a first terminal coupled to a source of the first N-type MOSFET 138, and a second terminal coupled to the drain of the first N-type MOSFET 138. The second N-type MOSFET 142 has a gate coupled to the fourth input terminal of the H-shaped full-bridge circuit 104, and a drain coupled to the drain of the second P-type MOSFET 134, and a source coupled to the source of the first N-type MOSFET 134. The fifth diode 144 has a first terminal coupled to the source of the second N-type MOSFET 142, and a second terminal coupled to the drain of the second N-type MOSFET 142. Note that both the sources of the first P-type MOSFET 130 and the second P-type MOSFET 134 are coupled to the pin VDD for receiving a voltage inputted at the pin VDD. Both the sources of the first N-type MOSFET 138 and the second N-type MOSFET 142 are coupled to ground. All of the first P-type MOSFET 130, the second P-type MOSFET 134, the first N-type MOSFET 138, and the second N-type MOSFET 142 are utilized for providing required currents for driving the motor 116.

The DC motor driving circuit 100 is biased with both a DC voltage, which is inputted through the pin VDD, and ground, which is coupled through the pin GND. The control module 102 is utilized for controlling voltage levels of gates of the first P-type MOSFET 130, the second P-type MOSFET 134, the first N-type MOSFET 138, and the second N-type MOSFET 142, for switching on or switching off the listed MOSFETs, and for tuning a required current for driving the motor 116. The control module 102 may be implemented with a digital logic circuit or an analog amplifier control circuit. Bias voltages of the Hall sensor 126 are determined by both the voltage level at the pin VDD and the resistance of the resistor 128. The operational amplifier 106 is utilized for amplifying voltage levels, which are outputted from the Hall sensor 126 and at the pins H+ and H−, so that the amplified voltage levels are respectively outputted at nodes PO and NO, as shown in FIG. 1, for usage of succeeding elements. The lock/restart module 112 transmits a command for ordering the control module 102 to shut down transistors of the H-shaped full-bridge circuit 104 when fans of the motor 116 are jammed. After the transistors of the H-shaped full-bridge circuit 104 are shut down for a while, the lock/restart module 112 transmits another command to the control module 102 for activating the motor 116 by turning on the transistors. The comparator 108 is utilized for switching on or switching off the transistor 110. When the transistor 110 is switched on by receiving an output signal from the first output terminal of the comparator 108, the voltage level at the drain of the transistor 110, i.e., the voltage level at the pin FG, may be detected from an external system, where the signal at the pin FG indicates a rotational velocity of the motor 116. Moreover, when an output signal is outputted from the first output terminal of the comparator 108, a reset signal is also outputted from the second output terminal of the comparator 108 to the lock/restart module 112 for resetting the status of the lock/restart module 112, where the reset signal is a one shot pulse. The thermal shutdown module 114 is utilized for ordering the control module 102 to shut down the transistors of the H-shaped full-bridge circuit 104 when the motor 116 is overheated. Therefore, the H-shaped full-bridge circuit 104 ceases generating biasing currents, and the temperature of the motor 116 ceases increasing as well. The motor driving voltage source 120 is utilized for providing required bias voltages of the H-shaped full-bridge circuit 104 (or the DC motor driving circuit 100 as well) through the pin VDD. The first diode 122 is utilized for preventing currents from the pin VDD from reversely flowing to the motor driving voltage source 120 with its reverse bias. Besides, when the motor driving voltage source 120 is erroneously connected in poles, the first diode 122 prevents the DC motor driving circuit 100 from being burnt down as well. The capacitor 124 is utilized for draining backflow currents of the motor 116, and for stabilizing the voltage level at the pin VDD. The Hall sensor 126 is utilized for detecting the magnetic filed generated by operations of the motor 116 to output corresponding signals to both the pins H+ and H− so that the DC motor driving circuit 100 is informed with variations of the magnitude of the magnetic field. Note that the motor 116 indicates an inductive loading so as to store electric power. The pin PWM receives pulse width modulation (PWM) signals from a system terminal, where switching on or switching off the transistors of the H-shaped full-bridge circuit 104 by the control module 102 primarily follows the pulse width modulation signals when the motor 116 is normally operated. For example, when the motor 116 is normally operated, and when the pulse width modulation signal stays high, the transistors of the H-shaped full-bridge circuit 104 switches on or switches off by following voltage levels of both the pins H+ and H−, and the motor 116 is biased by the voltage level at the pin VDD. When the motor 116 is normally operated, and when the pulse width modulation signal stays low, both the first P-type MOSFET 130 and the second P-type MOSFET 134 are switched off, and both the first N-type MOSFET 138 and the second N-type MOSFET 142 are switched on. At this time, the voltage level at the pin VDD is isolated by both the shut-down transistors, and the motor 116 cannot be biased with the pin VDD so that power consumption is saved.

Please refer to FIG. 2, which is a waveform diagram of voltage levels at pins of the DC motor driving circuit 100 shown in FIG. 1 when the control module 102 shown in FIG. 1 is implemented with an analog amplifier controlling circuit. Note that the symbol "Imotor" shown in FIG. 2 indicates a bias current of the motor 116. As shown in FIG. 2, at the moment when the voltage levels at both the pins H+ and H− intersect, i.e., when the magnetic pole of the motor 116 is changed, envelopes of the voltage levels at both the pins OUT1 and OUT2 vary smoothly between a positive voltage level and a negative voltage level, and therefore, the current Imotor varies smoothly so that less noises from the motor 116 are generated. However, when the control module 102 is implemented with a digital logic circuit, the envelopes of the voltage levels at both the pins OUT1 and OUT2 vary significantly between the high voltage level and the low voltage level, and therefore, the current Imotor vary sharply so that more noises from the motor 116 are generated. But the power consumption of the motor 116 is smaller when the control module 102 is implemented with the digital logic circuit. Note that the analog amplifier controlling circuit is merely an exemplary embodiment of the control module 102 in voltage level transition, and other conventional embodiments are not further described herein. Note that the frequency of the signal at the pin FG is the same with the signals at both the pins H+ and H−, and therefore, the frequency of the signal at the pin FG is able to indicate a rotational frequency of the motor 116 so that the system terminal may be informed with a corresponding rotational velocity of the motor 116. At last, the system terminal accordingly outputs a pulse width modulation signal having an adequate duty cycle for ordering the control module 102 to tune the rotational velocity of the motor 116. When the system terminal is overheated, the duty cycle of the pulse width modulation signal is increased for increasing both the bias current and the rotational velocity of the motor 116 to enhance heat dissipation of the system terminal. When the temperature of the system terminal is decreased so that the motor 116 is not required to enhance heat dissipation, the system terminal accordingly outputs a pulse width modulation signal having a smaller duty cycle (even 0%) for reducing the bias current of the motor 116, and for saving unnecessary power consumption of the motor 116 as well.

Please refer to FIG. 3, which is a waveform diagram of voltage levels at certain pins illustrated in FIG. 2 when the motor 116 shown in FIG. 1 is locked by unknown reasons. As shown in FIG. 3, in the operating period, voltage levels at the pins H+, H−, OUT1, OUT2, and FG are normal when the motor 116 are normally operated. However, in the first restart period, since fans of the motor 116 are jammed or interrupted magnetically, voltage levels at the pins H+ and H− are kept constant. The voltages levels at the pins OUT1 and OUT2 for indicating a voltage difference of the motor 116 are kept constant as well so that there are no changes in the magnetic field, but the voltage level at the pin OUT1 stays high for keeping on restarting the motor 116. At this time, since the motor 116 is not operated, the voltage level at the pin FG for indicating a rotational frequency of the motor 116 stays at low. After the first restart period is over, since there are no responses in the motor 116 for a while, for saving power consumption, the voltage level at the pin OUT1 is changed to be low for significantly weakening the current flowing through the motor 116 during the standby periods shown in FIG. 3. After several successive restart periods along with several standby periods pass, when the factor for hindering the motor 116 from operating is removed in a certain restart period or a certain standby period, the restart/operating period shown in FIG. 3 begins, and the motor 116 may be normally operated again by the voltage difference between the pins OUT1 and OUT2. Moreover, voltage levels at other pins shown in FIG. 3 are back to normal as well.

SUMMARY OF THE INVENTION

The claimed invention provides a motor driving circuit having low current consumption under a standby mode. The motor driving circuit comprises a driving module, a Hall sensor, a pulse width modulation (PWM) signal source, and a motor. The driving module comprises a power cutter, a control module, an oscillator, a counter, a S-R latch, a Hall bias, a lock/restart module, an H-shaped full-bridge circuit, an operational amplifier, a comparator, and a first transistor. The control module has a first input terminal coupled to an output terminal of the power cutter. The oscillator has an input terminal coupled to the output terminal of the power cutter. The counter has a first input terminal coupled to the output terminal of the power cutter, and a second input terminal coupled to an output terminal of the oscillator. The S-R latch has a Set terminal coupled to an output terminal of the counter, and a positive logic output terminal coupled to an input terminal of the power cutter. The Hall bias has an input terminal coupled to the output terminal of the power cutter. The lock/restart module has a first input terminal coupled to the output terminal of the power cutter, and an output terminal coupled to a second input terminal of the control module. The H-shaped full-bridge circuit has a first input terminal coupled to a first output terminal of the control module, a second input terminal coupled to a second output terminal of the control module, a third input terminal coupled to a third output terminal of the control module, and a fourth input terminal coupled to a fourth output terminal of the control module. The operational amplifier has a first output terminal coupled to the third output terminal of the control module, a second output terminal coupled to a fourth input terminal of the control module, and a first input terminal coupled to the output terminal of the power cutter. The comparator has a first input terminal coupled to the first output terminal of the operational amplifier, a second input terminal coupled to the second output terminal of the operational amplifier, a third input terminal coupled to the output terminal of the power cutter, and a first output terminal coupled to a second input terminal of the lock/restart module. The first transistor has a gate coupled to the second output terminal of the comparator. The Hall sensor has an input terminal coupled to an output terminal of the Hall bias, a first output terminal coupled to the first input terminal of the operational amplifier, and a second input terminal coupled to the second input terminal of the operational amplifier. The pulse width modulation (PWM) signal source is coupled to a third input terminal of the counter, a Reset terminal of the S-R latch, and a fifth input terminal of the control module. The motor has a first input terminal coupled to the first output terminal of the H-shaped full-bridge circuit, and a second input terminal coupled to the second output terminal of the H-shaped full-bridge circuit.

These and other objectives of the present invention will no doubt become obvious to those of ordinary skill in the art after reading the following detailed description of the preferred embodiment that is illustrated in the various figures and drawings.

DETAILED DESCRIPTION

As technologies evolve, reducing power consumption becomes an important topic. For example, reducing power consumption of portable electronic products, such as a laptop or a cell phone, is highly researched and concentrated. In designing a motor driving circuit, reducing the power consumption becomes important as well. A DC motor driving circuit is provided in the present invention. Power consumption of the provided DC motor driving circuit reaches a degree of microamperes or less when the motor is not operated and stays at a standby mode. Compared to conventional motor driving circuits having power consumption in a degree of milliamperes in a standby mode, power consumption is significantly saved in the DC motor driving circuit provided in the present invention. Moreover, as microprocessors evolve, the motor is required to be operated less frequently, i.e., the time for activating the standby mode of the motor is getting more frequently. Therefore, the weaker the current of the motor under the standby mode is, the more the power consumption of the motor driving circuit is saved. The DC motor driving circuit provided in the present invention reduces power consumption of the motor by weakening the current of the motor under the standby mode.

Figure 1:
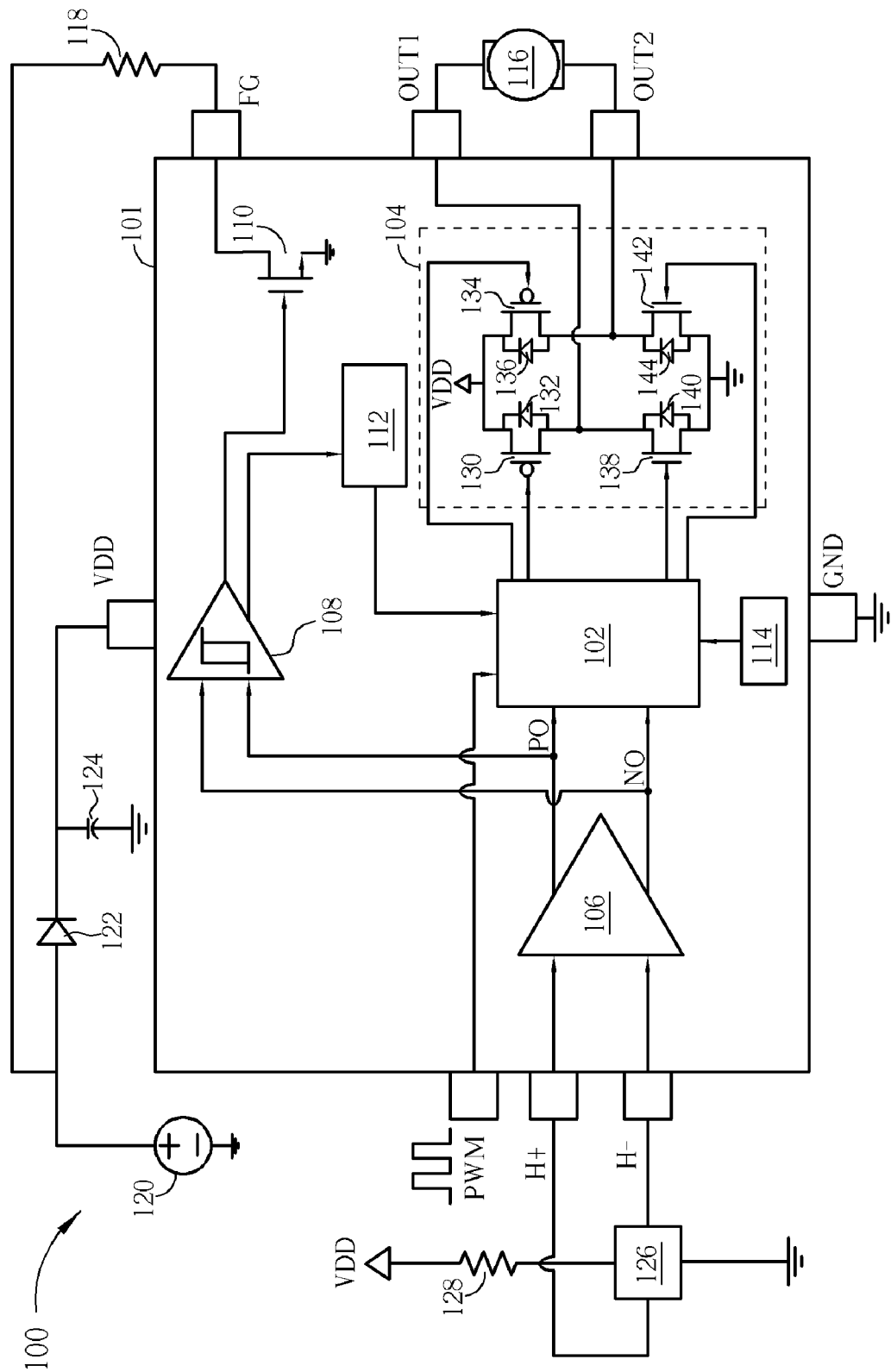
FIG. 1 is a diagram of a conventional DC motor driving circuit.
Figure 2:
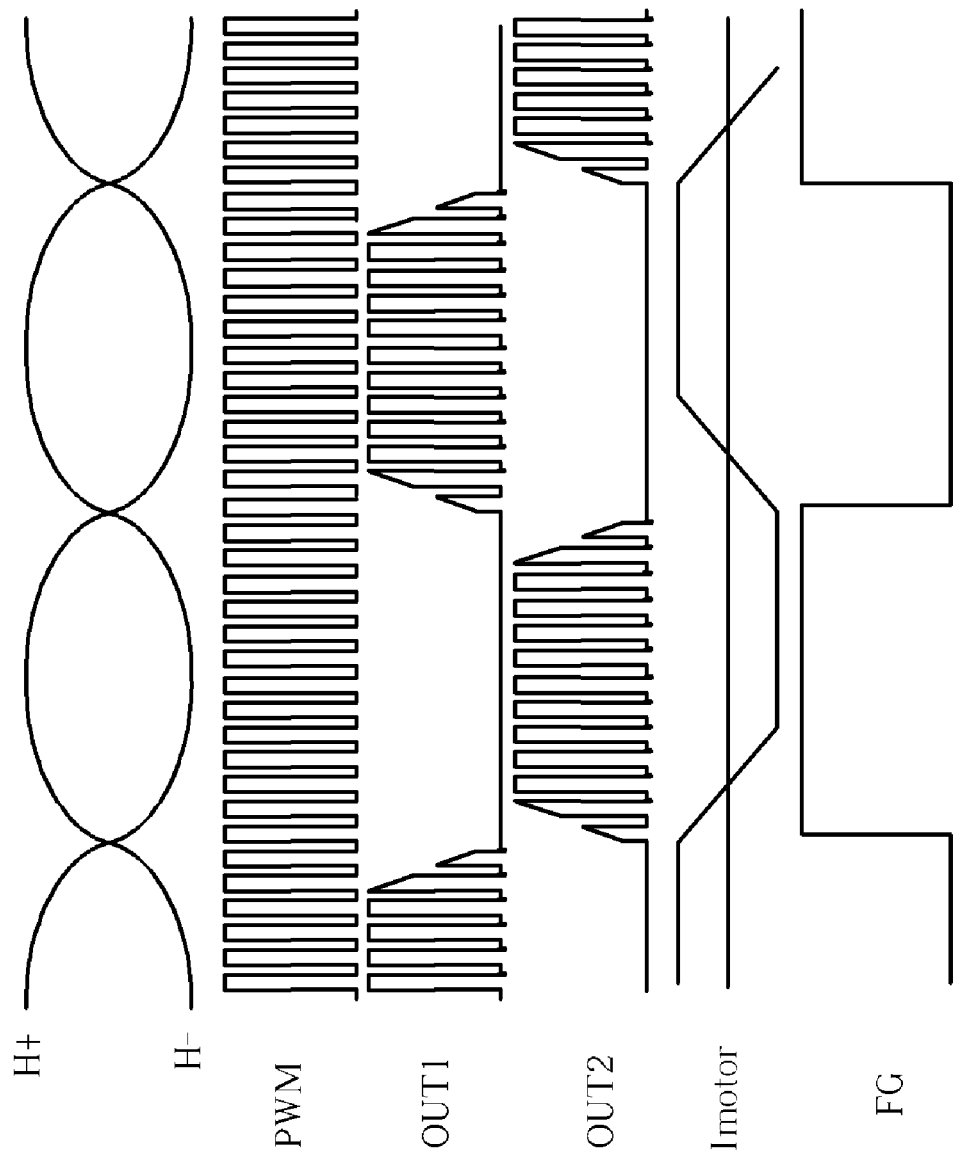
FIG. 2 is a waveform diagram of voltage levels at pins of the DC motor driving circuit shown in FIG. 1 when the control module shown in FIG. 1 is implemented with an analog amplifier controlling circuit.
Figure 3:
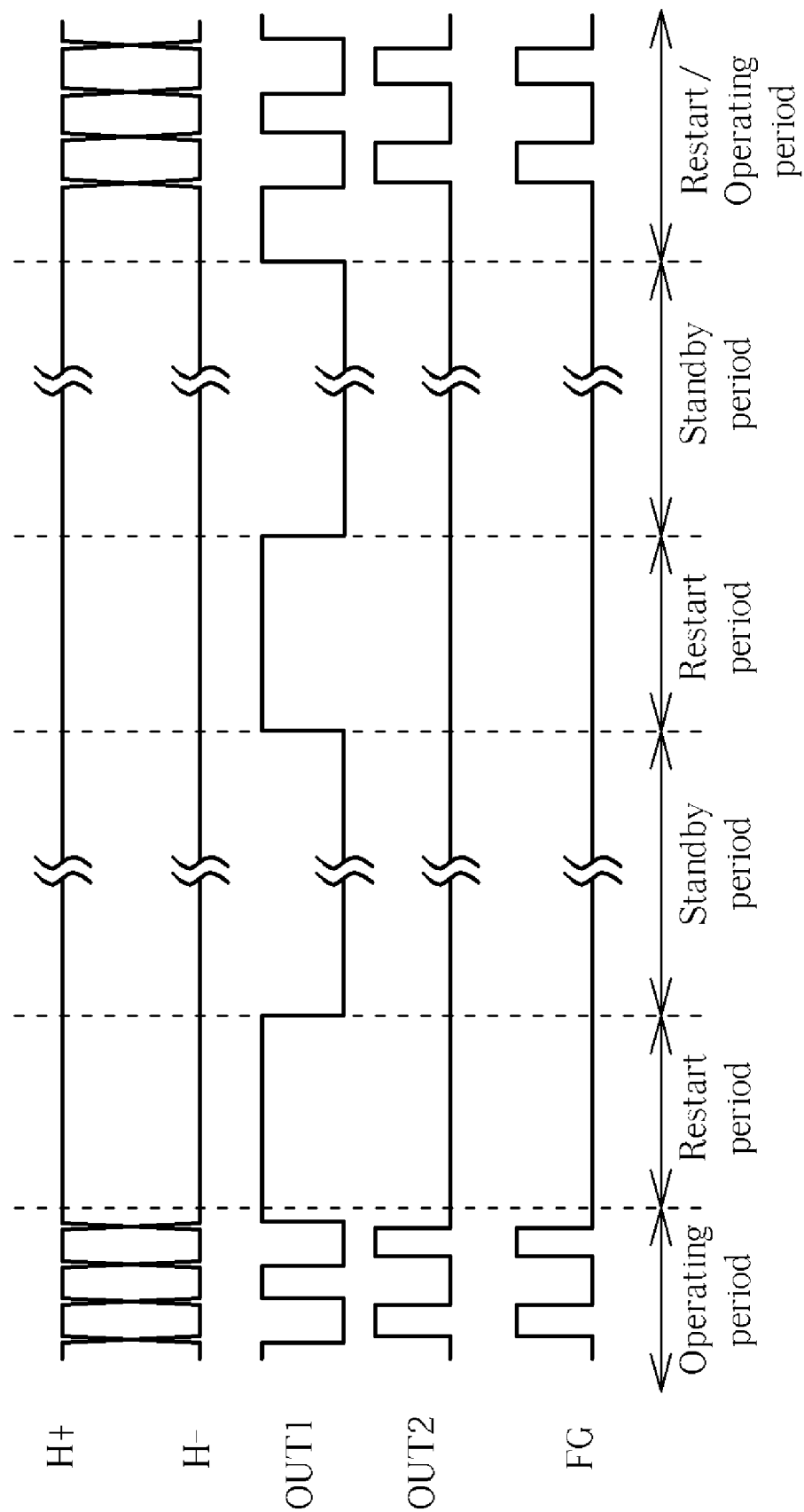
FIG. 3 is a waveform diagram of voltage levels at certain pins illustrated in FIG. 2 when the motor shown in FIG. 1 is locked by unknown reasons.

Compared to the DC motor driving circuit 100 and the driving module 101 as shown in FIG. 1, a few elements are added in the present invention, and both the DC motor driving circuit 200 and the driving module 201 are thus formed. In other words, most utilized elements of both the driving modules 101 and 201 are the same so that overlapped couplings described in FIG. 1 are not described again in FIG. 4.

Figure 4:
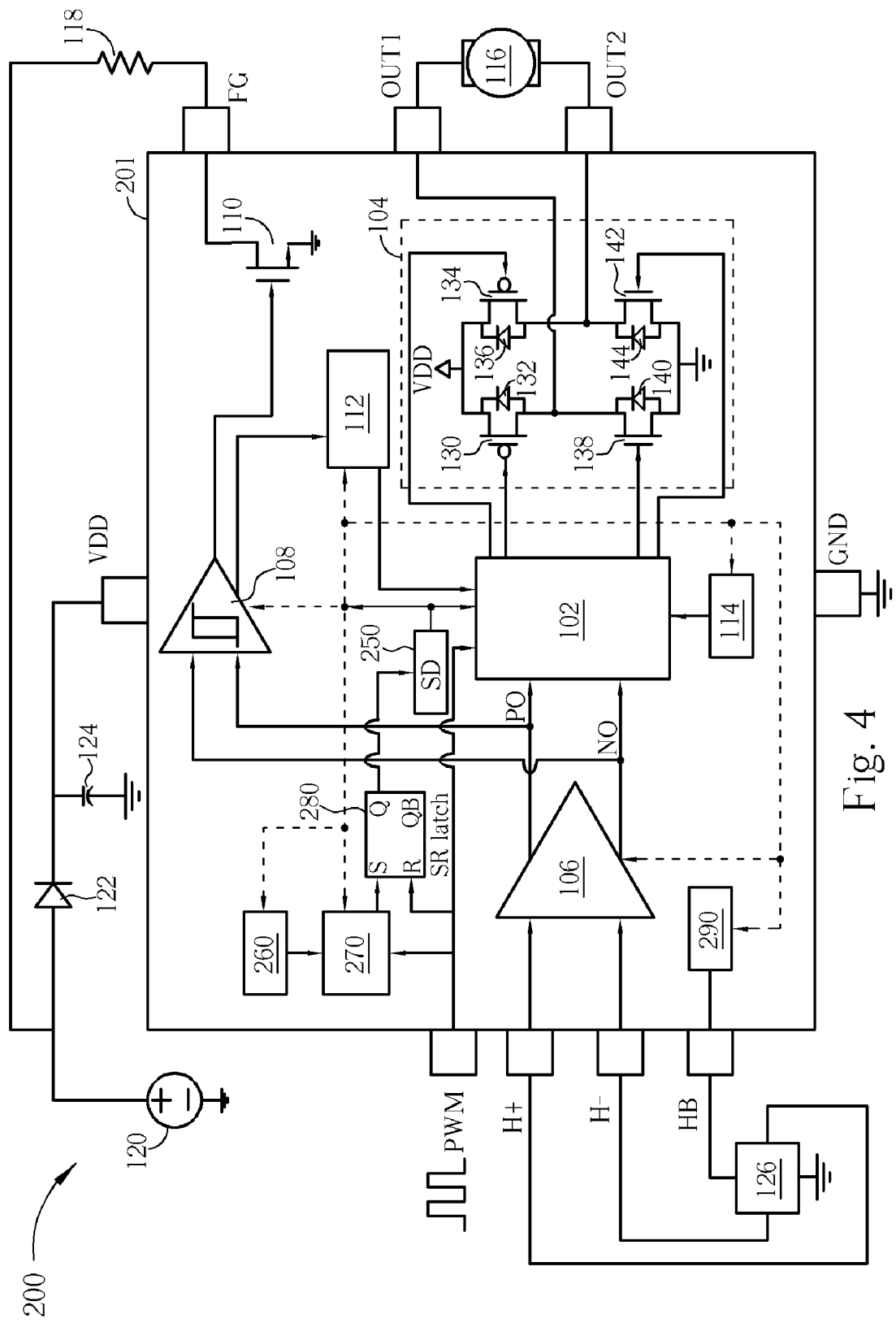
FIG. 4 is a diagram of the DC motor driving circuit provided in the present invention.

Please refer to FIG. 4, which is a diagram of the DC motor driving circuit 200 provided in the present invention. The difference between the DC motor driving circuits 100 and 200 lies in the driving module 201. Compared to the driving module 101 shown in FIG. 1, the driving module 201 further includes a power cutter 250, an oscillator 260, a counter 270, a S-R latch 280, and a Hall bias 290. The power cutter 250 has an output terminal coupled to the first input terminal of the control module 102, the third input terminal of the comparator 108, the first input terminal of the lock/restart module 112, an input terminal of the oscillator 260, a first input terminal of the counter 270, the input terminal of the thermal shutdown module 114, the first input terminal of the operational amplifier 106, and an input terminal of the Hall bias 290. The power cutter 250 is utilized for generating a disabling signal for disabling the control module 102, the comparator 108, the lock/restart module 112, the oscillator 260, the counter 270, the thermal shutdown module 114, the operational amplifier 106, and the Hall bias 290. Note that in the present invention, the power cutter 250 merely generates the disabling signal while the input terminal of the power cutter 250 stays low, whereas the power cutter 250 further generates an enabling signal while the input terminal of the power cutter 250 stays high. The oscillator 260 has an output terminal coupled to the first input terminal of the counter 270. The oscillator 260 is utilized for outputting a switch current to the counter 270. The counter 270 has a third input terminal coupled to the pin PWM, and an output terminal coupled to the Set terminal of the S-R latch 280. The counter 270 is utilized for counting how long the pin PWM is kept on staying low. The S-R latch 280 has the Reset terminal coupled to the pin PWM, and a positive logic output terminal, which is denoted as Q as well, coupled to the input terminal of the power cutter 250 for activating the disabling signal of the power cutter 250. Note that the pin VDD and the resistor 128 are not utilized for supplying power to the Hall sensor 126 nor adjusting an input current of the Hall sensor 126 in the DC motor driving circuit 200, but the Hall bias 290 disposed inside the driving module 201 is utilized for supplying power to the Hall sensor 126 or adjusting the input current of the Hall sensor 126 instead. The Hall bias 290 has an output terminal coupled to the pin HB for supplying a constant power to the Hall sensor 126 to detect variations in the magnetic field of the motor 116. In the DC motor driving circuit 100, the pin VDD is originally utilized for supplying power to the Hall sensor 126, and a corresponding Hall bias has to be disposed outside the DC motor driving circuit 100 as well. As mentioned above, in the DC motor driving circuit 200 provided in the present invention, the Hall sensor 126 is supplied power by the Hall bias 290 disposed inside the driving module 201. Therefore, room for disposing the Hall bias outside the DC motor driving circuit is saved, and the Hall sensor 126 may be cut in power more rapidly with the aid of the neighboring power cutter 250. Note that the Hall bias 290 may be implemented with a conventional regulator so that the Hall sensor 126 may be supplied with a power having a variable voltage level.

Operations of the DC motor driving circuit 200 are roughly described as follows. When the fans of the motor 116 are not required to rotate, i.e., when the DC motor driving circuit 200 stays at the standby mode, a duty cycle of a pulse width modulation signal at the pin PWM is 0. In other words, the pulse width modulation signal is continuously low at this time. The counter 270 counts how long the pulse width modulation signal stays at low. When the pulse width modulation signal stays at low over a predetermined critical time, the power cutter 250 generates the disabling signal for disabling elements coupled to the output terminal of the power cutter 250, and for switching off transistors of the H-shaped full-bridge circuit 104 as well. Under such a circumstance, the power consumption of the DC motor driving circuit 200 reaches a degree of microamperes or less, and therefore, the aim of the present invention in significantly reducing the power consumption of the DC motor driving circuit under a standby mode is achieved. The power cutter 250 may be implemented with a conventional digital logic circuit so as to lead the DC motor driving circuit 200 to much less power consumption under the standby mode. Moreover, when the power cutter 250 is implemented with complementary metal-oxide semiconductors (CMOS), the corresponding power consumption is much significantly reduced. As mentioned above, when the Hall bias 290 is implemented with a regulator, the Hall sensor 126 is supplied with a power having a variable voltage level, which is directly proportional to a bias voltage of the Dc motor driving circuit 200, and therefore, the fact saves much power consumption when the motor is normally operated. Moreover, when the DC motor driving circuit 200 is under the standby mode, the disabling signal generated by the power cutter 250 disables the Hall bias 290 so that there is no power consumption in the Hall bias 290 at this time. The power cutter 250 also disables the comparator 108 so that the gate of the transistor 110 stays low, and the transistor 110 is thus continuously switched off. At this time, the drain of the transistor 110 stays high so that the pin FG continuously stays high as well.

Figure 5:
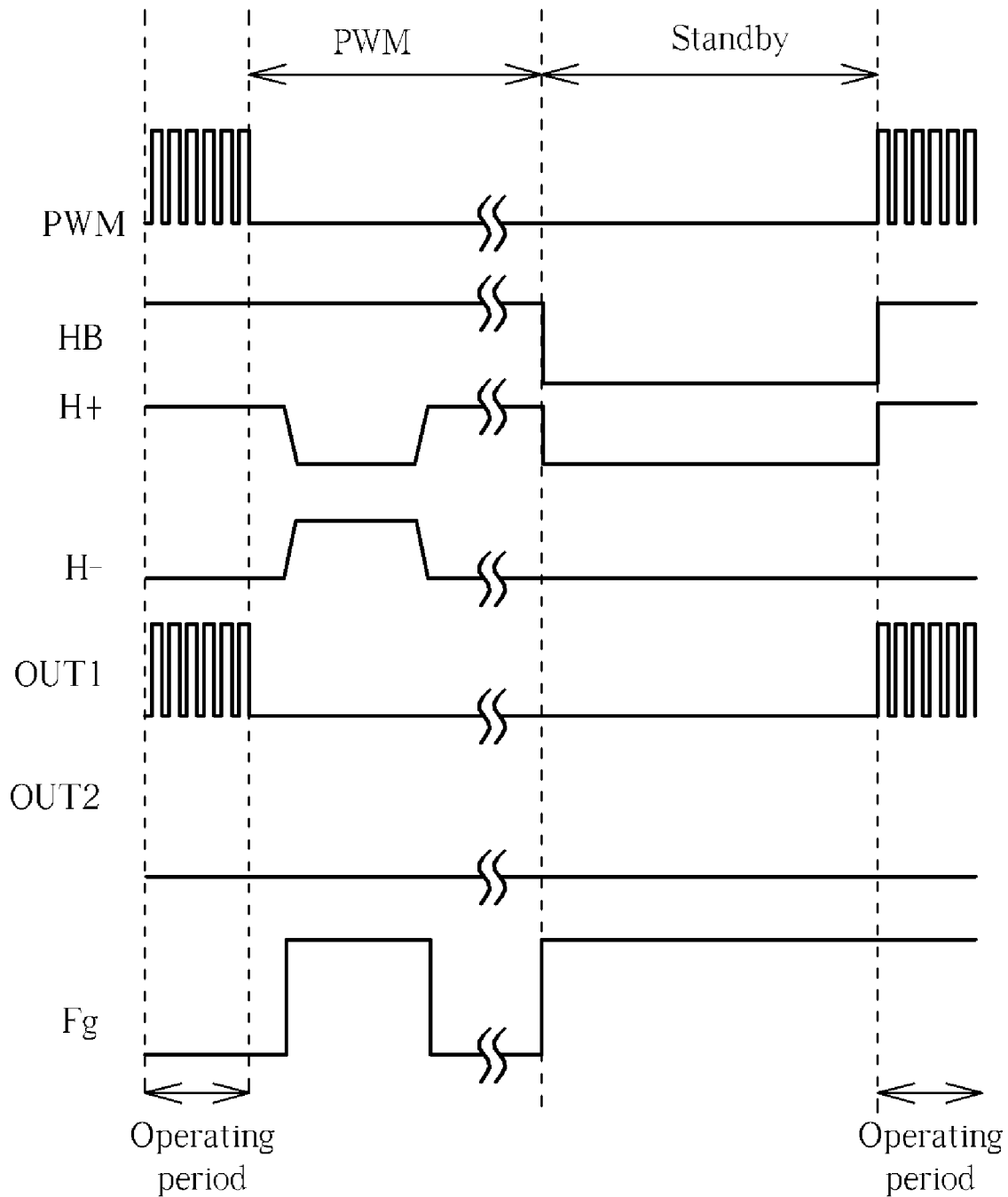
FIG. 5 is a waveform diagram illustrating voltage levels at pins of the DC motor driving circuit shown in FIG. 4.

Please refer to FIG. 5, and please refer to FIG. 4 as well. FIG. 5 is a waveform diagram illustrating voltage levels at pins of the DC motor driving circuit 200 shown in FIG. 4. As mentioned before, when the DC motor driving circuit is normally operated, i.e., during the operating period, voltage levels at the pins of the DC motor driving circuit 200 stay normal. When the voltage level at the pin PWM is kept on going low for a predetermined time, i.e., when the DC motor driving circuit 200 enters at the standby mode, the counter 270 outputs a signal having a high voltage level to the Set terminal of the S-R latch 280 so that the S-R latch 280 satisfies a condition that the Set terminal stays high whereas the Reset terminal stays low. At this time, the positive logic output terminal of the S-R latch 280 stays low, which is common with conventional S-R latches so as not to be discussed further. After sensing the low voltage level at the positive logic output terminal of the S-R latch 280, the power cutter 250 generates the disabling signal for disabling most elements of the driving module directly or indirectly. For example, because the power cutter 250 disables the Hall bias 290, the pin HB stays low, the Hall sensor 126 is not supplied with power, and both the pins H+ and H− stay low. After receiving the disabling signal, the operational amplifier 106 pulls voltage levels at both the nodes PO and NO down to be low. Both the lock/restart module 112 and the thermal shutdown module 114 also shut down its analog elements after receiving the disabling signal, and disable its digital elements so as not to affect the control module 102. After the comparator 108 receives the disabling signal, the first output of the comparator 108 stays low so that the gate of the transistor 110 stays low as well, the transistor 110 is thus switched off, and the voltage level at the drain of the transistor 110 is raised to be high. In other words, at this time, the pin FG continuously stays at high so that the pin FG cannot indicate the rotational frequency of the motor 116. After the control module 102 receives the disabling signal, the control module 102 switches off both the first P-type MOSFET 130 and the second P-type MOSFET 134 so that the motor 116 cannot be supplied with power through the pin VDD. The control module 102 also switches on both the first N-type MOSFET 138 and the second N-type MOSFET 142 so that the voltage levels at both the pins OUT1 and OUT2 continuously stay at ground. The oscillator 260 and the counter 270 are shut down after receiving the disabling signal. Therefore, the oscillator 260 ceases outputting the switch current, and the counter 270 ceases counting for saving unnecessary power consumption. Note that both the Set terminal and the Reset terminal of the S-R latch 280 stay low because the counter 270 is shut down. Herein, the current of the driving module 201 is weakened to a degree of microamperes or less, and the aim of reaching a least current consumption in the DC motor driving circuit 200 under the standby mode is achieved. At last, when the system terminal tends to reactivate the motor 116, the pulse width modulation signal is restored to a status of interleaving high and low voltage levels. When the pulse width modulation signal is restored to be high, the S-R latch is reset, and satisfies a condition that the Set terminal stays high whereas the Reset terminal stays low. Therefore, the positive logic output terminal of the S-R latch 280 stays high so as to have the power cutter 250 to output the enabling signal. The elements disabled by the power cutter 250 directly or indirectly are enabled after receiving the enabling signal, and the motor 116 is returned to be normally operated again. Note that whether the power cutter 250 outputs the enabling signal or the disabling signal, there is a certain operating order between the elements enabled or disabled. For example, the power cutter 250 merely outputs the enabling signal instead of the disabling signal after the pin HB is completely changed from low to high, therefore, the precision of the voltage levels at the pins H+ and H− is ensured, and the precision of other functions replying on both the voltage levels at the pins H+ and H− is ensured also.

The present invention provides a DC motor driving circuit having a low current consumption under a standby mode, for improving the defect of having a higher current consumption under the standby mode in the prior art, where the higher current consumption leads to a higher power consumption as well. In the DC motor driving circuit provided by the present invention, a counter counts how long a pulse width modulation signal, which is inputted to the DC motor driving circuit, is kept on staying low, and has the DC motor driving circuit of the present invention enter the standby mode when the pulse width modulation signal stays at low over a predetermined period of time. Then the counter triggers a S-R latch to have a power cutter to output a disabling signal. Any element receiving the disabling signal is disabled or shut down, and thus has least current consumption, where the motor has least current consumption as well. At this time, the current consumption of the DC motor driving circuit of the present invention reaches a degree of microamperes or less. When the system terminal generates a high pulse width modulation signal for reactivating the motor, the S-R latch and the power cutter are utilized again for restoring the DC motor driving circuit back to normal operations. Besides, since the Hall sensor utilized in the present invention is supplied with power through a built-in Hall bias, room for coupling an external Hall bias is saved. The Hall bias may also be implemented with a regulator. Therefore, under normal operations of the DC motor driving circuit of the present invention, the Hall bias may dynamically adjust the supplied power according to a bias voltage of the DC motor driving circuit, and significant current consumption may thus be saved.

Those skilled in the art will readily observe that numerous modifications and alterations of the device and method may be made while retaining the teachings of the invention.

What is claimed is:

1. A motor driving circuit having low current consumption under a standby mode, comprising:
   a driving module, comprising:
      a power cutter;
      a control module having a first input terminal coupled to an output terminal of the power cutter;
      an oscillator having an input terminal coupled to the output terminal of the power cutter;
      a counter having a first input terminal coupled to the output terminal of the power cutter, and a second input terminal coupled to an output terminal of the oscillator;
      a S-R latch having a Set terminal coupled to an output terminal of the counter, and a positive logic output terminal coupled to an input terminal of the power cutter;
      a Hall bias having an input terminal coupled to the output terminal of the power cutter;
      a lock/restart module having a first input terminal coupled to the output terminal of the power cutter, and an output terminal coupled to a second input terminal of the control module;
      an H-shaped full-bridge circuit having a first input terminal coupled to a first output terminal of the control module, a second input terminal coupled to a second output terminal of the control module, a third input terminal coupled to a third output terminal of the control module, and a fourth input terminal coupled to a fourth output terminal of the control module;
      an operational amplifier having a first output terminal coupled to the third output terminal of the control module, a second output terminal coupled to a fourth input terminal of the control module, and a first input terminal coupled to the output terminal of the power cutter;
      a comparator having a first input terminal coupled to the first output terminal of the operational amplifier, a second input terminal coupled to the second output terminal of the operational amplifier, a third input terminal coupled to the output terminal of the power cutter, and a first output terminal coupled to a second input terminal of the lock/restart module; and
      a first transistor having a gate coupled to the second output terminal of the comparator;
   a Hall sensor having an input terminal coupled to an output terminal of the Hall bias, a first output terminal coupled to the first input terminal of the operational amplifier, and a second input terminal coupled to the second input terminal of the operational amplifier;
   a pulse width modulation (PWM) signal source coupled to a third input terminal of the counter, a Reset terminal of the S-R latch, and a fifth input terminal of the control module; and
   a motor having a first input terminal coupled to the first output terminal of the H-shaped full-bridge circuit, and a second input terminal coupled to the second output terminal of the H-shaped full-bridge circuit.

2. The motor driving circuit of claim 1 further comprising:
   a frequency generating resistor having a first terminal coupled to a drain of the first transistor;
   a voltage source having an output terminal coupled to a second terminal of the frequency generating resistor;
   a diode having a first terminal coupled to the second terminal of the frequency generating resistor; and
   a capacitor having a first terminal coupled to a second terminal of the diode and a voltage input terminal of the driving module.

3. The motor driving circuit of claim 1 wherein the H-shaped full-bridge circuit comprises:
   a first P-type MOSFET having a gate coupled to the first input terminal of the H-shaped full-bridge circuit;
   a second diode having a first terminal coupled to a drain of the first P-type MOSFET, and a second terminal coupled to a source of the first P-type MOSFET;
   a second P-type MOSFET having a gate coupled to the third input terminal of the H-shaped full-bridge circuit;
   a third diode having a first terminal coupled to a drain of the second P-type MOSFET, and a second terminal coupled to a source of the second P-type MOSFET;
   a first N-type MOSFET having a gate coupled to the second input terminal of the H-shaped full-bridge circuit, and a drain coupled to the drain of the first P-type MOSFET;
   a fourth diode having a first terminal coupled to a source of the first N-type MOSFET, and a second terminal coupled to the drain of the first N-type MOSFET;
   a second N-type MOSFET having a gate coupled to the fourth input terminal of the H-shaped full-bridge circuit, a drain coupled to the drain of the second P-type MOSFET, and a source coupled to the source of the first N-type MOSFET; and
   a fifth diode having a first terminal coupled to the source of the second N-type MOSFET, and a second terminal coupled to the drain of the second N-type MOSFET.

4. The motor driving circuit of claim 3 wherein the source of the first P-type MOSFET is coupled to a DC voltage source, and the source of the first N-type MOSFET is coupled to ground.

5. The motor driving circuit of claim 1 wherein the driving module further comprises:

a thermal shutdown module having an input terminal coupled to the output terminal of the power cutter, and an output terminal coupled to a sixth input terminal of the control module.

* * * * *